United States Patent Office 3,598,558
Patented Aug. 10, 1971

3,598,558
GLASS MOLD TEMPERATURE CONTROL APPARATUS
Daniel R. Ayers, Shelburne, Vt., assignor to Corning Glass Works, Corning, N.Y.
Filed June 11, 1969, Ser. No. 832,365
Int. Cl. C03b *11/12*
U.S. Cl. 65—161                    4 Claims

ABSTRACT OF THE DISCLOSURE

Apparatus for controlling the temperature of each of a plurality of molds to within a desired temperature range therefor, each such mold being intermittently positioned at a station where a cooling fluid control valve associated with the respective mold is adjusted in accordance with a temperature adjustment signal representing adjustment necessary in the respective valve to bring the temperature of the respectively associated mold to the desired temperature for such mold.

BACKGROUND OF THE INVENTION

There is disclosed in Letters Patent of the United States, 3,071,967, issued Jan. 8, 1963, to R. J. Mouly, a temperature measuring system useful in measuring and controlling the temperature of molds in which articles are formed from a heated or molten material. FIG. 12 of such patent illustrates automatic control for adjusting the temperature of each of a plurality of molds, such as those mentioned, in accordance with the measured or sensed temperature of one of said plurality of molds. The description of the operation of the control illustrated in said FIG. 12 is covered in lines 17 through 49 of column 17 of said patent.

It has recently been recognized that the temperature of each of a plurality of molds being used to form similar articles from a heated or molten material should not necessarily be the same temperatures as any of the other molds of such plurality in order to produce ware or articles having similar characteristics such as shape and dimensions. Furthermore, each said mold may have cooling characteristics differing from those of the other molds of the plurality thereof and, therefore, require a different amount of cooling fluid to be supplied thereto in order to maintain it within its optimum temperature range for the ware or articles to be formed. It is therefore, readily apparent that automatically controlling the supply of cooling fluid to all of a plurality of molds in accordance with the sensing of the temperature of one mold of such plurality does not provide a type of automatic control system that is the most desirable possible. Accordingly, an automatic control system for controlling the temperature of each of a plurality of molds in accordance with the article-forming and cooling characteristics of each respective mold and the sensed temperature of each such mold following each forming operation performed thereby was developed. Such control system is disclosed in copending patent application Ser. No. 778,280, filed Nov. 22, 1968 by Raymond J. Mouly and Robert L. Thomas, such application being assigned to the same assignee as the present application.

In the control system of said copending application there is provided at a mold cooling station an adjustable cooling fluid control valve for supplying cooling fluid to each mold positioned at such station. Such valve is adjusted for each mold arriving at the cooling station and cooling fluid is supplied to the molds only at such station. It is believed obvious that it is more expedient to provide a cooling air control valve for each said mold and for such valves to be carried on the machine which carries such molds. By such an arrangement cooling air can be supplied to said molds continuously or during any selected period or periods in the movement of said molds from station to station by said machine. Valves such as disclosed in copending patent application, Ser. No. 672,098, filed Oct. 2, 1967 by Daniel R. Ayers and Darrell E. Chapin, and assigned to the same assignee as the present application, are intended for such purpose.

In employing fluid flow control valves such as disclosed in said copending application of Messrs. Ayers and Chapin, it is expedient, for obvious economical reasons, to provide only a single set of apparatus for controlling or adjusting all of said valves, such set of apparatus being located at a selected location along the path of movement of said molds and their respectively associated valves, and each such valve being selectively adjusted while it and its associated mold dwells at such location. However, for such purpose it is necessary, of course, that said valve control or adjustment apparatus not be permanently connected with the machine which carries said valves and their associated molds. Accordingly, it is the object of the present invention to provide apparatus located at a selected station or position along the path of movement of said molds and valves, such apparatus being operative to selectively adjust each said valve while it dwells at said selected station or position and, thereby, to selectively control the temperature of each said mold by varying the amount of cooling air supplied thereto.

SUMMARY OF THE INVENTION

In accomplishing the above object of the invention, there is provided a pressurized fluid actuated actuator including a fluid cylinder whose piston rod is normally maintained in a retracted position within such cylinder and which is actuable to extend said piston rod different distances corresponding to different values of pressurized fluid signals supplied to the actuator. A second pressurized fluid cylinder and associated piston rod are also provided, such piston rod being also normally maintained in a retracted position within its associated cylinder and capable of exerting a force somewhat less than the piston rod of said cylinder of said actuator. Said cylinders and their associated piston rods are located at a selected station along the path of movement of forming molds and their associated cooling air control valves so that the ends of piston rods are actuable through paths of travel to contact first and second ends, respectively, of valve actuating cross members of said valves and, thereby, rotatively adjust each such valve to supply a selected amount of cooling air to the respectively associated mold.

BRIEF DESCRIPTION OF THE DRAWINGS

In the drawings.

Similar reference characters refer to similar parts in each of the figures of the drawings.

PREFERRED EMBODIMENT OF THE INVENTION

Figure 1:
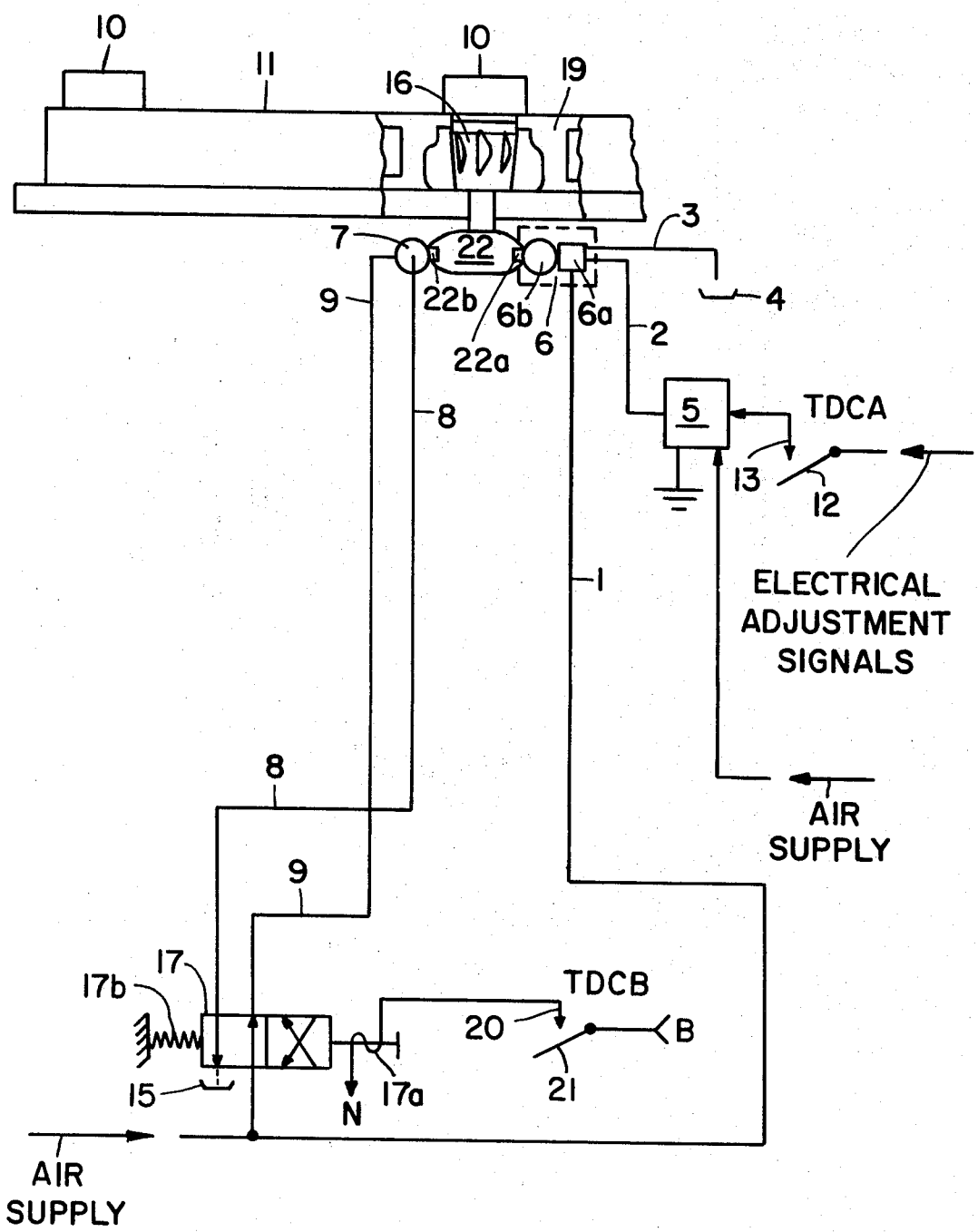
FIG. 1 is a partly elevational and partly diagrammatic view of one form of apparatus embodying the invention.

Referring to the drawings in detail, there is shown in FIG. 1 an indexing or intermittently positioned press table or turret 11 which carries a plurality of molds such as 10 which are successively and intermittently moved or indexed through a plurality of stations or positions including a mold charging station, a forming station, an article take-out station, and a mold cooling control valve adjustment station. Table 11 may, for example, be the rotating table of a turret type glass-forming machine.

A rotatably adjustable cooling fluid control valve such as 16 is provided below each mold such as 10 and controls a suitable supply of cooling fluid, such as compressed air for example, to each respectively associated mold. However, for purposes of simplification of the drawings, only one valve such as 16 is shown therein. The valves such as 16 may, for example, be similar to the fluid flow control valve disclosed in the aforecited copending patent application of Messrs. Ayers and Chapin, and each such valve includes a cross member such as 22 by which the respective valve can be selectively rotatably adjusted to vary the amount of cooling fluid or air supplied to the respectively associated mold. The cross-member such as 22 corresponds to cross member 46 shown in FIGS. 2, 3 and 4 of said patent application of Messrs. Ayers and Chapin.

Figure 2:
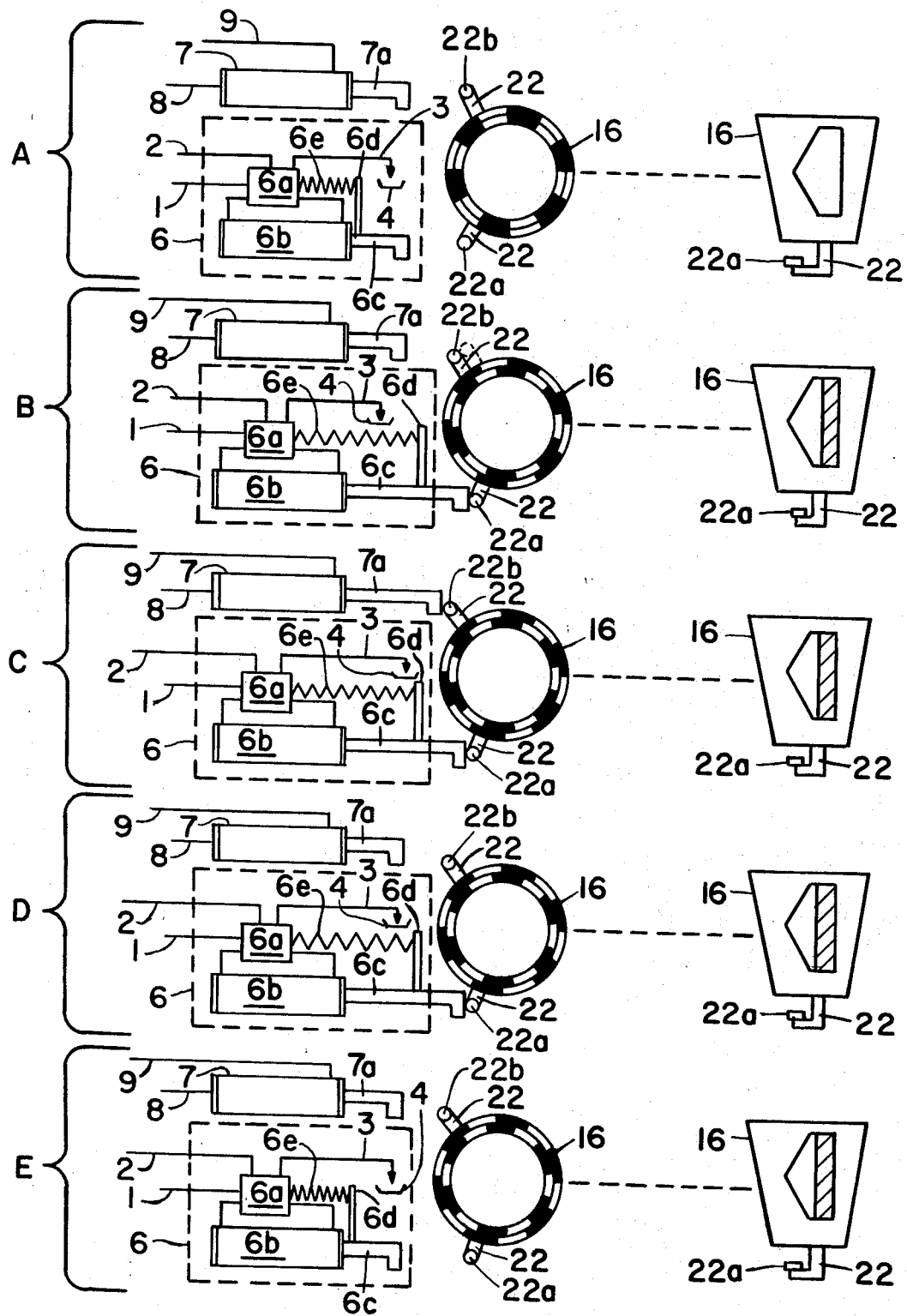
FIG. 2 illustrates in steps A through E the operation of the apparatus of FIG. 1 when adjusting a cooling fluid control valve to change the amount of cooling air supplied to a forming mold.

Referring further to FIG. 1, taken in conjunction with FIG. 2, there is shown a valve actuator 6 including a positioner 6a, and a pressurized fluid cylinder and associated piston rod 6b and 6c, respectively. The end of piston rod 6c bends approximately 90° to provide an L-shaped end on such rod whose purpose will become apparent as the description proceeds. There is also affixed to piston rod 6c a laterally extending member or arm 6d to which is attached one end of an expansion coil spring 6e. The other end of spring 6e is shown attached to positioner 6a so that the spring is expanded when piston rod 6c is actuated out of its associated cylinder 6b. Actuators such as 6 are well known and such actuator may, for example, be a Type 480 air cylinder valve actuator which includes an integrally mounted positioner such as 6a and which is sold by Fisher Governor Company, Marshalltown, Iowa 50158. The piston rod such as 6c of actuator 6 is normally maintained retracted within cylinder 6b as shown in step a of FIG. 2, and, upon the supplying of a pressurized fluid signal to the actuator as hereinafter discussed, piston rod 6c is actuated out of the cylinder a distance corresponding to the value of such pressurized fluid signal, as illustrated in step B of FIG. 2. Such actuation of piston rod 6c expands spring 6e to provide a negative positional feedback signal to positioner 6a to make the actuated position of rod 6c in cylinder 6b correspond to the value of said pressurized fluid signal. Upon the termination of the fluid signal, piston rod 6c is again retracted within cylinder 6b.

A second pressurized fluid cylinder 7 and associated piston rod 7a is also provided, such piston rod being capable of exerting a force somewhat less than that which is exerted by piston rod 6c. The end of piston rod 7a also bends approximately 90° to provide an L-shaped end on such rod similar to the end of piston rod 6c and whose purpose will also become apparent as the description proceeds.

It is expedient to here point out that valve 16 shown in FIG. 2 corresponds to the valve 16 shown in FIG. 1 but such valve is somewhat schematically illustrated in FIG. 2 only for purposes of hereinafter setting forth an operational example of the invention.

There is also shown in FIG. 1 a solenoid actuated fluid flow control valve 17 including a solenoid winding 17a and a compressible coil spring 17b which will be discussed further hereinafter. An electro-pneumatic transducer 5 is also provided. Transducers such as 5 are well known in the art and such transducer may, for example, be a Type 545 electro-pneumatic transducer which is also sold by the previously mentioned Fisher Governor Company. Transducer 5 is connected to a supply of pressurized fluid, such as compressed air for example, and such transducer produces pneumatic output signals having values corresponding or proportionate to the values of electrical input or adjustment signals supplied to the transducer, as hereinafter further discussed.

The previously mentioned fluid flow control valve 17 is connected to a suitable source or supply of pressurized fluid such as compressed air and such fluid normally flows through the valve and through a suitable fluid conduit 9 to one end of pressurized fluid cylinder 7 (FIG. 2) to maintain piston rod 7a normally retracted within the cylinder. At such time the other end of cylinder 7 is connected through a suitable fluid conduit 8 and valve 17 to atmosphere or to a suitable fluid sink 15. When the solenoid winding 17a of valve 17 is energized as hereinafter discussed, valve 17 is actuated to reverse the connections from the valve to conduits 8 and 9. At such time said other end of cylinder 7 is connected to the pressurized fluid supply while the end of such cylinder previously connected to said supply is connected through valve 17 to fluid sink 15 or to atmosphere. Piston rod 7a is, thereby, actuated to its extended condition at such time. Upon subsequent deenergization of solenoid winding 17a, a coil spring 17b of valve 17 reactuates such valve to its normal position shown in FIG. 1, and rod 7a is, thereby, returned to its normal retracted position within cylinder 7. This will be further discussed hereinafter in an operational example of the invention.

There is further shown in FIG. 1, electrical circuit controlling contacts TDCA and TDCB which may, for example, be contacts on the conventional timing drum used for controlling the indexing of press table or turret 11. Contact TDCA includes a movable contact member 12 which is actuated by said timing drum against a fixed contact point 13 shortly following the indexing of each mold such as 10 to the cooling valve adjustment station shown in FIG. 1. Contact member 12 is also reactuated by said timing drum to its open position shown in FIG. 1 immediately prior to the departure of each said mold from said adjustment station. Contact TDCA supplies an electrical adjustment signal to electro-pneumatic transducer 5 for each said mold, such as 10, which is moved to the adjustment station. Each such adjustment signal has a value representative of adjustment necessary in the valve such as 16 to adjust the supply of cooling air supplied to the mold such as 10 to bring the temperature of such mold to a desired preset temperature therefor. The apparatus or system for producing such adjustment signals forms no part of the present invention but such signals may, for example, be supplied to transducer 5 from a temperature recorder such as 26 as illustrated in FIG. 9 or 12 of the aforecited Mouly patent, or said signals may be supplied to transducer 5 from a digital computer such as 19 as shown in the aforecited copending application of Messrs. Mouly and Thomas. As previously mentioned transducer 5 produces a pneumatic output or adjustment signal corresponding in value to or representative of the value of each electrical adjustment signal supplied to the transducer over said contact TDCA. Such pneumatic adjustment signals are supplied over a suitable fluid conduit 2 to positioner 6a of actuator 6. Such positioner is also connected over a suitable fluid conduit 3 to atmosphere or a suitable fluid sink 4.

Previously mentioned timing drum contact TDCB (FIG. 1) includes a movable contact member 21 which is actuated by the previously mentioned timing drum against a fixed contact point 20 a brief period following the closure of contact members 12–13 of timing drum contact TDCA. Contact TDCB is also reactuated to a circuit interrupting condition a brief period prior to the opening of members 12–13 of contact TDCA. The purpose of such timing of the actuations of contact TDCB will become apparent hereinafter. As shown in FIG. 1 movable contact member 21 of contact TDCB is connected to the positive terminal B of a source of direct electrical current suitable for energization of solenoid winding 17a of valve 17 and, therefore, upon the closing of such contact member against fixed contact point 20 of contact TDCB, a circuit to said solenoid winding is closed. Such circuit extends from said terminal B over contact members 20–21 of contact TDCB and thence through said solenoid winding 17a to negative terminal N of said current source. For purposes of simplification of the drawings said source of electrical current is not shown therein but, as mentioned, its positive and negative terminals are designated B and N, respectively.

The apparatus of the invention having thus been discussed in detail, a brief operational example of the invention will be given.

It will first be assumed that the cooling air control valve 16, associated with the mold 10 and shown in FIG. 1 as having been moved by table or turret 11 to the cooling air control valve adjustment station, is fully open as illustrated in FIG. 2 and that said mold 10 has been found to be too cool. Under such conditions an electrical control or adjustment signal, having a value corresponding to proportionate to, or representative of, adjustment required in said valve 16 to reduce the amount of cooling air supplied to mold 10, is supplied to movable contact member 12 of timing drum contact TDCA. Upon closing of such member 12 against fixed contact point 13 of contact TDCA, said electrical adjustment signal is supplied to transducer 5 and such transducer produces a pneumatic output adjustment signal having a value corresponding or proportionate to, or representative of, the value of said electrical adjustment signal. Such pneumatic signal thus produced is supplied over conduit 2 to positioner 6a of actuator 6. Positioner 6a, which is also connected over a suitable fluid conduit 1 to a suitable source of pressurized fluid such as compressed air, is operated by said pneumatic signal to supply pressurized fluid to cylinder 6b of actuator 6 and piston rod 6c is, thereby, actuated or extended out of cylinder 6b a distance proportionate or corresponding to said pneumatic adjustment signal. At such time the end of piston rod 6c contacts and pushes against a roller 22a on a first end of cross member or arm 22 of valve 16 (steps A and B of FIG. 2) and cross member 22 is thereby actuated to rotatably actuate valve 16 to a partially closed condition, as illustrated in step B of FIG. 2, to reduce the amount of cooling air supplied through such valve to mold 10.

Following the above actuations of piston rod 6c and of valve 16, timing drum contact TDCB closes (FIG. 1) and solenoid winding 17a of valve 17 is energized to reverse the connections to conduits 8 and 9 connected to cylinder 7. Pressurized fluid or compressed air then flows through conduit 8 to cylinder 7 to extend or actuate piston rod 7A of such cylinder to contact and push against a roller 22b on the second end of cross member 22 of valve 16 (step C of FIG. 2). Such actuation or extending of piston rod 7a causes roller 22a to be pressed into firm contact with the end of piston rod 6c of cylinder 6b of actuator 6 and, if arm 22 and, therefore, valve 16 over-traveled when roller 22a was contacted and pushed by the end of piston rod 6c, correction is made for such over-travel.

As illustrated in step D of FIG. 2, following the above actuation of piston rod 7a of cylinder 7, contact TDCB again opens and the solenoid winding 17a of valve 17 is deenergized (FIG. 1). Spring 17b then reactuates valve 17 to its normal position and the connections to conduits 8 and 9 are again reversed, that is, are reactuated to their normal condition shown in FIG. 1. Piston rod 7a is, thereby, reactuated to its retracted position within cylinder 7. As illustrated in step E of FIG. 2, following said reactuation of piston rod 7a of cylinder 7, contact TDCA of the aforementioned timing drum reopens and the electrical adjustment signal to transducer 5 is interrupted. This, in turn, interrupts the pneumatic adjustment signal to positioner 6a of actuator 6 and piston rod 6c returns to its normal retracted position within cylinder 6b of actuator 6. Both of the piston rods 6c and 7a now clear table or turret 11 so that another mold such as 10 and its associated valves such as 16 can be indexed by such table or turret to the valve adjustment station for the adjustment of the valve associated with such other mold.

It will now be assumed that, upon the completion of a complete revolution of table or turret 11 so that the mold 10 and its associated valve 16 shown in FIG. 2 are again positioned at the valve adjustment station, such mold 10 is too hot and, therefore, that the adjustment signal supplied to the apparatus is of a value such as to cause actuation of valve 16 to open further and increase the amount of cooling air to mold 10. Under such conditions, piston rod 6c is actuated as previously discussed, that is, is actuated or extended a distance proportionate or corresponding to the value of the adjustment signal then supplied to the apparatus. Such adjustment signal is of a lesser value than that previously supplied to the apparatus and, therefore, piston rod 6c will not be actuated or extended to as great a distance as that previously described. The end of such piston rod will, therefore, not contact roller 22a of cross member 22 at such time but will stop somewhat short of such roller. Upon the subsequent actuation or extending of piston rod 7a of cylinder 7, the end of such piston rod will contact roller 22b on the second end of cross member 22, and such member will be pushed to rotate valve 16 to a further open condition until roller 22a pushed into contact with the end of piston rod 6c. Since piston rod 7a is, as previously mentioned, capable of exerting a lesser force than piston rod 6c of cylinder 6b, further rotative adjustment of valve 16 will be prevented when roller 22a contacts the end of piston rod 6c. Thereafter, piston rods 7a and 6c are actuated to their retracted positions in the same manner and sequence as previously discussed, and valve 16 supplies a larger amount of cooling air to mold 10 during the next revolution of table or turret 11. Similar adjustments are repeated during each revolution of table or turret 11 unless the adjustment signal for the mold under discussion has a value corresponding or proportionate to the desired temperature for such mold.

In the light of the above discussion it will be readily apparent that each valve, such as 16, which is indexed to the valve adjustment station will be adjusted, in a manner similar to that just described, to supply a greater or lesser amount of cooling air to the respectively associated mold such as 10, each such adjustment being proportional to or corresponding to an adjustment signal supplied to the apparatus and representative of adjustment required in the respective valve to bring the temperature of its associated mold to a desired temperature therefor.

I claim:
1. In an apparatus comprising,
 (A) a machine for forming articles from a molten material and including an intermittently indexed table or turret which intermittently positions each of a plurality of forming molds at each of a plurality of stations, and
 (B) a rotatable cooling fluid control valve carried on said machine below each said mold, each such valve including a cross-member for rotative adjustment of the respective valve, such cross-members being disposed below said table; additional apparatus for actuating said cross-members in accordance with the value of pressurized fluid temperature adjustment signals for said molds, such additional apparatus comprising;
  (a) an actuator selectively responsive to pressurized fluid signals and including a pressurized fluid cylinder with a fluid actuated piston rod normally actuated to a retracted position within the cylinder, such actuator located at a selected one of said plurality of stations with the free end of said piston rod actuatable through a path of travel towards a first end of said cross-member of each said valve positioned at said selected station, and said actuator operable to extend said piston rod a distance corresponding to the value of a pressurized fluid temperature adjustment signal supplied to the actuator;
  (b) another pressurized fluid cylinder with a fluid actuated piston rod normally actuated to a retracted position within the cylinder and capable of exerting a lesser force than the first mentioned piston rod, such other cylinder located at said selected station with the free end of its piston rod actuable through a path of travel towards the second end of said cross-member of each said valve positioned at said selected station;

(c) means operating, following the arrival of each of said valve at said selected station, to supply a pressurized fluid temperature adjustment signal, associated with the respective valve, to said actuator and to interrupt such signal prior to the departure of such valve from said station; and (d) means operating to supply pressurized fluid to said second cylinder to actuate the piston rod of such cylinder to move said free end thereof through its said path of travel and to reactuate said piston rod to its retracted position within the second cylinder all in the time period between the supply and interruption of said adjustment signal to said actuator.

2. Apparatus in accordance with claim 1 and in which said supplying of said signals and pressurized fluid to said cylinders is controlled by electrical contacts actuated in a time relationship with the movement of said intermittently indexed table.

3. Apparatus in accordance with claim 1 and in which said pressurized fluid is compressed air.

4. Apparatus in accordance with claim 2 and in which said pressurized fluid is compressed air.

References Cited
UNITED STATES PATENTS

| | | | |
|---|---|---|---|
| 2,532,153 | 11/1950 | Drescher et al. | 251—31 |
| 2,643,677 | 6/1953 | MacLean | 251—31 |
| 3,407,055 | 10/1968 | Argyle et al. | 65—161 |

ARTHUR D. KELLOGG, Primary Examiner

U.S. Cl. X.R.

65—162, 319; 251—31, 78